Sept. 18, 1962　　　N. B. COLEY　　　3,054,995
INDICATOR DISPLAY SYSTEM
Filed Sept. 26, 1958　　　　　　　　　　4 Sheets-Sheet 1

FIG. IA.
CONTROL AND CHECK CIRCUIT ORGANIZATION

ROW "A" INDICATORS

ROW "B" INDICATORS

BUS CHECKING RELAYS BCR

INVENTOR.
N. B. COLEY
BY
Forest B. Hitchcock
HIS ATTORNEY

Sept. 18, 1962   N. B. COLEY   3,054,995
INDICATOR DISPLAY SYSTEM
Filed Sept. 26, 1958   4 Sheets-Sheet 2

FIG. 2A.

CODE COMMUTATOR OF DISPLAY INDICATOR

SHOWN SET IN CODE POSITION NO. 2.

FIG. 2B.

EQUIVALENT CONTACTS FOR DIFFERENT COMMUTATOR POSITIONS

INVENTOR.
N. B. COLEY
BY
*Forest B. Hitchcock*
HIS ATTORNEY

Sept. 18, 1962     N. B. COLEY     3,054,995
INDICATOR DISPLAY SYSTEM
Filed Sept. 26, 1958                           4 Sheets-Sheet 3

FIG. IB.

INVENTOR.
N. B. COLEY
BY
HIS ATTORNEY

FIG. 3.

CODE TABLE

| DISPLAY INDICATOR POSITION NUMBERS | BUS WIRE NUMBERS | | | | |
|---|---|---|---|---|---|
| | 1 | 2 | 3 | 4 | 5 |
| 0 | + | o | + | + | o |
| 1 | o | + | + | + | o |
| 2 | o | + | o | + | + |
| 3 | o | o | + | + | + |
| 4 | + | o | + | o | + |
| 5 | + | o | o | + | + |
| 6 | + | + | o | + | o |
| 7 | + | + | o | o | + |
| 8 | o | + | + | o | + |
| 9 | + | + | + | o | o |

*INVENTOR.*
N. B. COLEY
BY
*Forest B. Hitchcock*
HIS ATTORNEY

United States Patent Office 3,054,995
Patented Sept. 18, 1962

3,054,995
INDICATOR DISPLAY SYSTEM
Nelson B. Coley, Rush, N.Y., assignor to General Railway Signal Company, Rochester, N.Y.
Filed Sept. 26, 1958, Ser. No. 763,493
22 Claims. (Cl. 340—334)

My invention relates in general to indicator display systems and more particularly to indicator display systems having circuit control means which will provide a check on the proper operation of the system.

In various indicator display systems, it is desirable to have provisions for the individual operation of the indicators such as in train reporting systems where information or data concerning a number of different items such as arrival and departure of trains, or the like may be displayed. This may be accomplished by means of groups or rows of indicators which are automatically and selectively actuatable or settable in response to incoming signals. This complete indicator display system (or parts thereof) is also particularly adaptable to a system for the transmission and posting of data relating to air traffic control in which the signals representing the information thus posted may be transmitted by code from a transmitter situated remotely from the receiving and posting apparatus.

It is also desirable to have provisions incorporated within the indicator display system to provide a check indication manifesting to the controller that the complete system has been functioning properly or that a particular component has not functioned properly. An indication of this sort is essential to a controller transmitting traffic control information where each element of displayed information is vital to the whole of the transmitted information.

One object of the present invention is the provision of an indicator display system capable of separately operating a particular indicator in a display by applying energy to less than the total number of operating buses in distinctive code combinations corresponding to the different positions of that indicator.

Another object of the present invention is the provision of an indicator display system having circuit control means which will show by a check indication means that the particular indicator selected has been operated to display a certain digit, character, or the like, in a position corresponding to the combination of energized operating buses.

Another object of the present invention is the provision of an indicator display system having circuit control means which will show by check indication means that the particular indicator selected has been operated to display a certain digit, character, or the like, in a position corresponding with the combination of deenergized operating buses.

Another object of the present invention is the provision of an indication display system having circuit control means which will show by check indication means that the particular indicator selected has been operated to display a certain digit, character, or the like, in a position corresponding to the combination of energized and deenergized operated buses.

Another object of the present invention is the provision of an indicator display system in which any one of a plurality of display indicators may be controlled over the same set of operating buses by applying energy to such operating buses in distinctive code combinations corresponding to the different positions of the indicators.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which.

In order to simplify the illustrations in the drawings and facilitate in the explanation of the fundamental characteristics of the invention, various parts and circuits have been shown diagrammatically in accordance with conventional symbols. Arrows with associated symbols (+) and (−) are employed to indicate connections of the circuits of the various relays to the opposite terminals of a suitable source of current for the energization of such relays; and the source of current may be of any suitable characteristic for the purpose intended. The various contacts of the relays involved in the illustrations are shown conventionally as being in a lower or inclined position when the coil or winding of the associated relay is deenergized, and in a raised or horizontal position when the relay is energized; the contacts belonging to any given relay are shown connected to its coil or winding by dotted lines, and these contacts may be either below or above the symbol for the relay winding. The front and back contacts between which the movable contacts are operated by the different relays are shown conventionally as arrowheads, and the movable contacts are ordinarily of the type which have their contacts biased downwardly by gravity or by spring action.

In general, the indicator display system comprises vertical rows of indicators, such indicators TIA and TIB; and horizontal rows of indicators, such as indicators TIA and UIA. The indicators TIA and UIA of row "A" are for displaying the tens and units digits of any desired number, or other symbols if desired. All of the unit digit indicators and all of the tens digit indicators are connected to the same controlling or operating buses 1, 2, 3, 4 and 5. Each of these operating buses has a checking relay connected to it, such as checking relays 1BCR, 2BCR, 3BCR, 4BCR and 5BCR for the respective buses 1, 2, 3, 4 and 5. A check repeating relay KCR is provided to energize a lamp K when any selected indicator has been properly positioned. A group of code receiving relays CRR are provided to apply different code combinations of energy to the operating buses 1, 2, 3, 4 and 5 for the operation of different selected indicators. Any particular indicator can be selected for operation in accordance with the code combination then applied to the control or operating buses 1, 2, 3, 4 and 5 by the closure of a contact assigned to that particular indicator. More specifically, push buttons PBUA, PBTA, PBUB and PBTB and respectively assigned to indicator units UIA, TIA, UIB and TIB. The operating buses thus may be energized at various times in different code combinations in accordance with the energization of a code receiving relay for operation one of the plurality of indicators, each indicator being responsive to such energization at those times dependent upon the actuated condition of its respective units or tens push button.

The indicator units, such as TIA, are assumed to be of any suitable type such as shown, for example, in the Field et al. Patent No. 2,731,632 or in the G. E. Marsh Patent No. 2,959,773, granted on November 8, 1960. For convenience in the illustration, the indicator of this disclosure is assumed to be of the ten position type, and for this reason, the structure of the above mentioned indicators would merely have to be modified to the extent of providing the proper gear ratios to give the ten different positions for the display element. In addition, the control commutators would have to be suitably constructed for a ten position indicator. One such suitable construction has been shown in FIG. 2A and this commutator is provided with ten different positions corresponding to the ten different positions of the display element. These different positions of the commutator make up suitable electrical circuits in accordance with the position of the indicator as will be later described. This particular number of positions has been selected for simplicity in the disclosure, but it is to be understood that any number of different positions may be employed when desired, but in such cases appropriate numbers of code wires must be used. Also, the commutator arrangement has been shown, since it is mechanically desirable to have a three-point brush contacting arrangement for each of the commutator portions. Since it is necessary to have six contacting brushes, then the commutator is arranged to have two separately movable sections or portions, but both concentrically rotated together. This three-point suspension provides good electrical contact by having the commutator portions spring biased against their respective three-fixed brushes. This particular structure is shown and described in the copending application of W. D. Maynard, Ser. No. 763,569, filed September 26, 1958, so that no claim is made in this application to this particular form of commutator and brush construction.

Figure 2A:
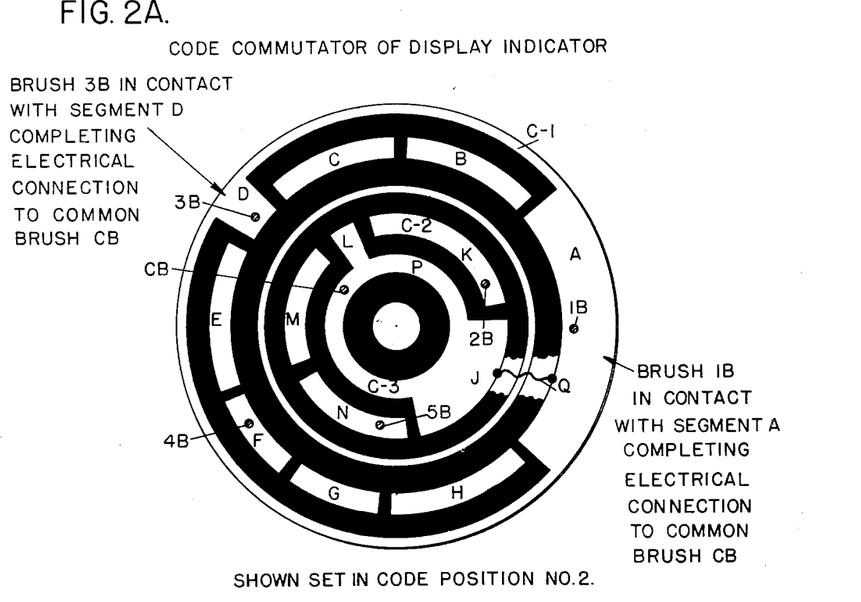
FIG. 2A is an enlarged view of a commutator-and-brush assembly showing the brushes resting on particular commutator segments in correspondence to energy applied to particular operating buses.

With more particular reference to FIG. 2A, the ten position indicator is operated to its different positions by a motor M through a suitable reduction gearing arrangement which operates the display element and the commutator portions. More specifically, two concentric commutator portions C–1 and C–2 connected by a pigtail Q are suitably connected to a revolving gear drum and are pressed by coil springs against their brushes. Six brushes, 1B, 2B, 3B, 4B, 5B and CB, are provided on a printed circuit board which cooperate with the segments A through H and J through N and P of the concentric commutator portions C–1 and C–2 to set up the proper circuits corresponding to any particular code applied to the control or operating buses. Five diodes 1D, 2D, 3D, 4D and 5D are connected between their respective printed circuit brushes and the corresponding control bus. The motor M of each indicator has one terminal connected to the common brush CB of that indicator, and has its other terminal leading over a bus to the selecting contact for such indicator. For example, the motor of indicator TIA is connected through bus CTA to the selecting push button contact PBTA. Of course, other type selecting contacts may be employed such as contacts on relays and the like in place of the push button contact PBTA.

Figure 3:
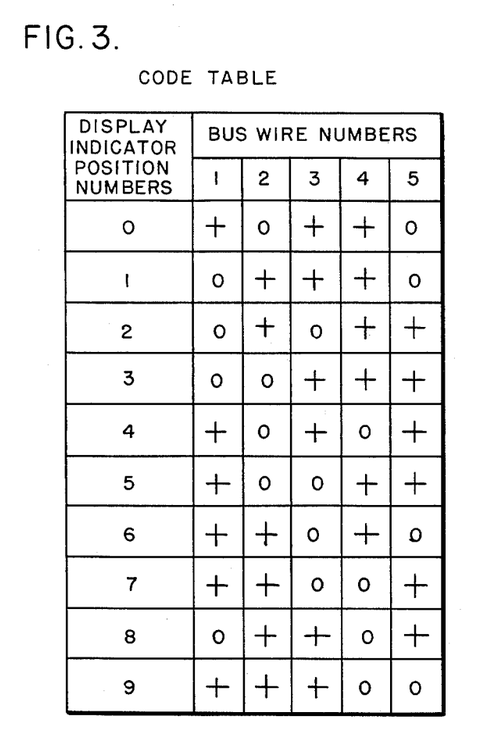
FIG. 3 is a code table which shows the energy required on particular operating buses for a particular display.

The segments of the concentric commutator sections or portions C–1 and C–2 are arranged to cooperate with the brushes 1B, 2B, 3B, 4B, 5B and CB to use certain codes of a binary code for its different positions. There are five operating buses extending to each indicator, but to operate any indicator to any one of its positions requires that energy be applied to only three of the five operating buses. This is illustrated in FIG. 3 of the drawings by the typical Code Table. The different display indicator positions are given in the left-hand column of the Code Table and the bus wires 1 through 5 are used to designate the five columns on the right of the Code Table. For example, to operate any indicator to its position No. 2, the bus wires 2, 4 and 5 have positive energy (+) applied to them; but, the bus wires 1 and 3 have no energy applied to them as indicated by the zero in the corresponding columns.

It will be readily appreciated that a binary code comprising five elements would produce thirty-two combinations. From these combinations, the present invention employs those in which three bus wires may be energized and two may be deenergized to identify any one of the ten different display indicator positions.

It will be readily appreciated that a binary code formed by using five elements or digits will have thirty-two combinations. From these thirty-two combinations, the present invention employs those in which one character occurs three times and the other character occurs twice. Since this is a binary code, there are two sets of combinations having these characteristics. Each of these sets has ten combinations. The present invention employs those combinations where one character of a particular kind occurs three times to represent bus wires energized to position the indicator, and where another character occurs twice to represent the bus wires employed to check the position which the indicator actually assumes. It should be obvious that the allotment of the characters of the code to positioning and checking may be reversed. Thus, the codes actually used for the different positions of the indicator have been shown in FIG. 3.

The symbol (+) is used to indicate the bus wires energized for operation of the display indicator to any particular position, and the symbol (0) is used to represent the bus wires employed for checking that particular position. In this way, codes are selected so that there is a distinct energization of the bus wires to position the display indicator, while there is another distinct combination of bus wires employed for checking purposes for each code selected. These might for convenience be termed complementary codes since the number of buses used for positioning and the number of buses used for checking always totals five. In this connection, it should be understood that binary codes with different numbers of digits may be employed when desired. This type of code selection is employed in order to make it possible to check the actual position of the indicator and fail to display such a check in the event the indicator is in some other than the called for position regardless of broken wires or other reasons for the lack of continuity of the circuits involved.

Figure 2B:
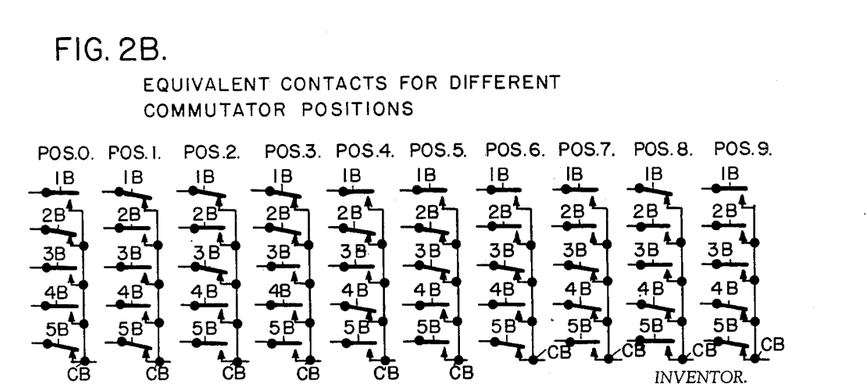
FIG. 2B shows the symbolic contact equivalent of the commutator of FIG. 2A in its different positions.

For convenience in the illustration, the commutator sections or portions C–1 and C–2 are shown in code position No. 2 in FIG. 2A. This shows the brush 1B in electrical contact with segment A which in turn completes an electrical circuit through pig-tail Q and segment P to the common brush CB. Referring to FIG. 2B, it is seen that contact 1 is shown in a back contact-making position for commutator position 2 symbolically illustrated.

Likewise, brush 3B is in electrical contact with segment D which in turn is connected through pig-tail Q to the segment P making electrical connection to the common bus CB. This is illustrated in FIG. 2B for commutator position 2 by showing contact 3 in a back contact-making position.

The brush 2B of FIG. 2A is making contact with segment K which is electrically isolated. This is illustrated in FIG. 2B by the open condition of contact 2 for commutator position 2. Similarly, the brush 4B of FIG. 2A is contacting segment F which is electrically isolated. The same is true with regard to brush 5B which is contacting segment N also electrically isolated.

In other words, the different contacting positions of the commutator typically illustrated in FIG. 2A can be reduced to a symbolic illustration as shown in FIG. 2B. In each of its different positions, there are always three of its brushes which are not connected to the common bus CB and there are two brushes which are electrically connected to the common bus CB. In this way, the application of positive energy to any three of the bus wires in the combinations set forth in the Code Table of FIG. 3 causes energy to be applied through the commutator contacts to the motor M until the motor has completed its operation to a corresponding position. This, of course, assumes that the selector contact for that indicator is closed.

Five bus checking relays 1BCR, 2BCR, 3BCR, 4BCR and 5BCR are provided, as above mentioned, one bus checking relay for each of the five operating buses. The upper and lower windings of each of these relays is connected in series with a limiting resistor across the opposite termnials of a suitable source, which source is considered to be the same one which is used to energize the operating buses and the various indicator motors. For example, the relay 1BCR is energized from (+) through a circuit including limiting resistor 1R, lower winding of relay 1BCR, upper winding of relay 1BCR, to (—). This energization is ineffective to actuate the armature and contacts of relay 1BCR because the current is flowing in opposite directions in the two windings so that their magnetic fluxes cancel each other. Since each of the bus checking relays BCR are similarly connected, their contacts are all normally in dropped away or released positions. Thus, the repeating relay KCR is normally deenergized and the lamp K is not energized.

It is believed that the nature of the invention, its advantages and characteristic features can best be understood with further description being set forth from the standpoint of operation.

Operation

Figure 1A:
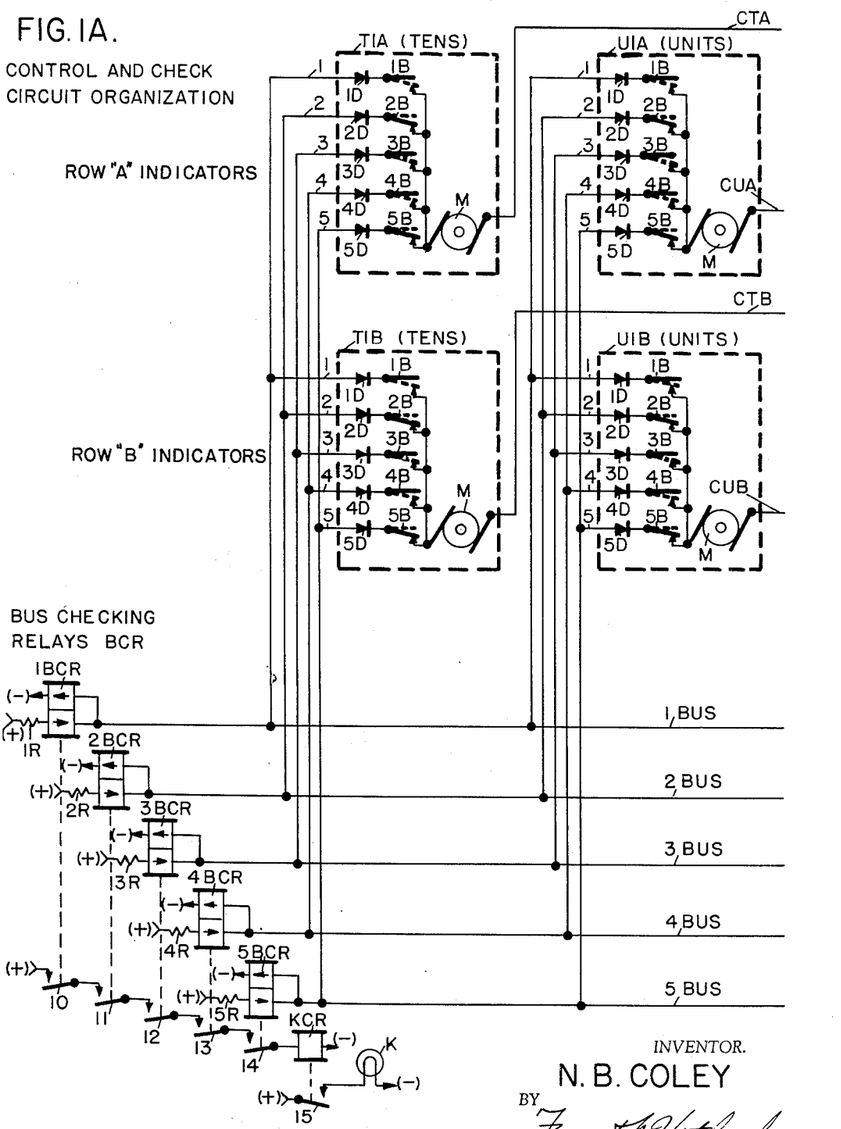
FIGS. 1A and 1B when placed side by side show a circuit diagram illustrating an indicator display system.
Figure 1B:
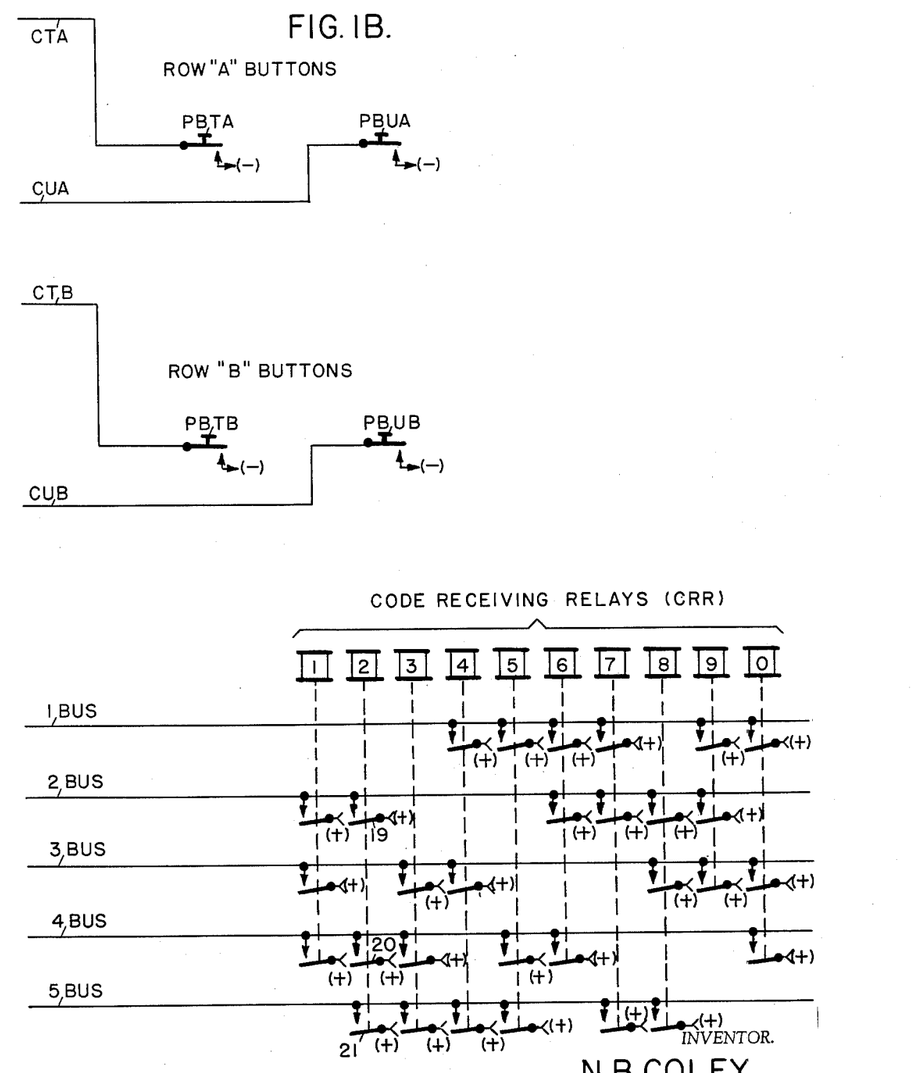

As above mentioned, under normal conditions all of the parts are in positions and conditions illustrated in FIGS. 1A and 1B. The exact positions occupied by the several indicators is unimportant, but for convenience in the illustration and in the discussion it will be assumed that they are in their zero (0) displaying positions so that their contacts assume positions illustrated in FIG. 2B for commutator position 0.

Let us assume that the code receiving relays CRR have just been conditioned in accordance with a code received over a Teletype system (or otherwise) resulting in the picking up of the code receiving relay 2CRR. This closes front contacts 19, 20 and 21 of relay 2CRR which applies positive energy (+) to the operating buses 2, 4 and 5. This positive energy on these buses in effect shunts the lower windings of the bus checking relays 2BCR, 4BCR, and 5BCR allowing their upper windings to be fully energized and causing them to pick up their respective contacts. Energy on these buses thus results in the immediate closure of front contacts 11, 13 and 14, but the contacts 10 and 12 of relays 1BCR and 3BCR are not closed until a selected indicator has been operated to the appropriate position called for by the existing energization of the operating buses.

Let us assume that the operator desires to set the units digit indicator UIA of row "A" in accordance with the code combination now applied to the operating buses. To do this he actuates the push button PBUA.

In the above, it is assumed that the indicator was standing in position 0. It will be noted from FIG. 2B that its contacts 2B and 5B are connected to the common brush CB for such position 0. This means that energy from buses 2 and 5 can flow through the diodes 2D and 5D, contacts 2B and 5B, motor M of indicator UIA, bus wire CUA, back contact push button PBUA, to (—). This energization of the motor M causes the indicator UIA to operate to its position 2 in which its contacts 2B, 4B and 5B are opened deenergizing its motor M. In passing through the position 1, it will be noted that only its contact 5B is connected to the common brush CB, but this is sufficient to carry it past position 1. In this connection, it should be noted that regardless of the position called for, there is always at least one of the contacts for the three energized operating buses closed for all other positions, so that energy is supplied to the motor M until the indicator reaches the position called for by that particular combination. At such time, the corresponding contacts are all open and the motor stops as just described in connection with the indicator UIA.

In the position 2, the contact 1B of the indicator UIA is closed to the common brush CB so that the negative terminal (—) of the suitable source is connected through the motor and diode 1D to the right-hand terminal of bus checking relay 1BCR. This in effect shunts the upper winding of this relay 1BCR with the relatively low resistance of the motor circuit and decreases the resistance of the circuit for the lower winding of this relay. This causes sufficient energy to flow in the lower winding of 1BCR to cause its armature and contact 10 to be actuated.

The same operation occurs with regard to relay 3BCR since the brush 3B is connected to the common brush CB for position 2 as illustrated in FIG. 2B. This causes relay 3BCR to actuate its contact 12 to a contact-making position.

Thus, as soon as the selected indicator UIA has operated to a position corresponding to the position called for by the code receiving relays, all of the bus checking relays BCR are picked up. This completes energization for the check repeating relay KCR from (+), through a circuit including front contact 10 of relay 1BCR, front contact 11 of relay 2BCR, front contact 12 of relay 3BCR, front contact 13 of relay 4BCR, front contact 14 of relay 5BCR, winding of relay KCR, to (—). This causes relay KCR to actuate its armature and colse front contact 15 which energizes lamp K through an obvious circuit. This advises the operator that the indicator unit UIA has properly responded to the received code. Thus, he may release the push button PBUA and be in readiness for posting the next code received.

It is, of course, to be understood that the code receiving relays will remain picked up for any code received until that code has been posted at which time they will drop away in readiness for receiving another code. It is also to be understood that the selecting contacts may be suitably controlled in accordance with the same or other codes received so as to be automatically selected in accordance with the reception of successive codes for different rows or the like. Although it is assumed that the present invention may be employed in various manual, semiautomatic or automatic posting systems the details of such systems have not been shown for the sake of simplicity in disclosing the characteristic features of the present invention.

The operation, as given, assumes that all the parts and circuits operate properly. Thus, at the end of a posting operation the indicator lamp K is illuminated. On the other hand should there be a faulty circuit or contact, resulting in the failure of the display indicator to assume a proper position, or even if it assumed a proper position but the circuits were faulty and failed to indicate such proper position, then the indicator lamp K is not illuminated at the end of a posting operation.

For example, let us assume that the indicator TIA is in the position 0 and that it is desired to operate this indicator to its position 2. This requires the application of positive energy to the bus wires 2, 4 and 5 (see FIG. 3). Let us assume that the bus wire 5 is broken, or that the contact 5B of indicator TIA fails to make. Referring to FIG. 2B, it will be observed that the energy applied to bus 2 will be effective through closed contact 2B to operate the display indicator to the position 1 in which contact 2B is then opened. The energy on bus 4 cannot operate the display indicator beyond the position 1 because contact 4B is open. Since it is assumed that energy does not reach the motor of the display indicator through the contact 5B, then the display indicator remains in position 1. In such position, the contact 3B is open so that no energy is supplied over the bus 3 to effect the picking up of the relay 3BCR in a manner previously described. Thus, under the circumstances assumed the relay KCR is not energized because of open front contact 12, and the indicator lamp K fails to be illuminated. This gives the information to the operator that the display indicator T1A has failed to operate to the position 2 called for by the energization of buses 2, 4 and 5. The principles of checking here explained also apply to all of the other positions of the display indicator.

From the above description, it will be readily understood that the picking up of any code receiving relay CRR results in the energization of the operating bus wires 1, 2, 3, 4 and 5 in accordance with the code pattern given in the Code Table of FIG. 3. For this reason the detailed operation for the various indicators will not be discussed in detail.

It should also be understood that the code receiving relay CRR may be arranged in any manner suitable for applying the different code combinations to the operating bus wires, and for this reason do not necessarily have to be in the arrangement shown.

The resistors 1R, 2R, 3R, 4R and 5R have been shown associated with their respective bus checking relays so as to limit the current in the lower windings of such relays and through the motor M of any selected indicator to such a value that the armature of that relay will pick up when thus connected but the current will not cause rotation of the motor M in the particular indicator selected. In this connection, the resistance 1R, for example, could be included in the lower winding of the relay 1BCR without using an external resistance. Since the organization shown in connection with these relays BCR would operate for various values of voltage and resistances of the various parts, no effort has been made to disclose specific values.

Each of the indicators includes a diode, in its connection to the operating buses. These diodes are included so that the closed contacts of the associated indicator do not provide a short across the corresponding operating buses and thus interfere with the operation of the other indicators connected to such operating buses. The use of these diodes thus allows each indicator to be individually operated and electrically isolated from the buses regardless of the position in which it is left standing. This permits any desired number of indicators to be operated from the same set of buses.

Having described an indicator display system as one specific embodiment of the present invention, it is desired to be understood that this form is selected to facilitate in the disclosure of the invention rather than to limit the number of forms which it may assume; and, it is to be further understood that various modifications, adaptations and alterations may be applied to the specific form shown to meet the requirements of practice, without in any manner departing from the spirit or scope of the present invention.

What I claim is:

1. In a changeable indicator display system, a particular number of operating buses, a changeable indicator having an electric motor for operating it to a plurality of different positions and having contacts individually cooperative with said operating buses and respectively opened and closed by the operation of said indicator to its different positions in accordance with code combinations respectively assigned to the different positions of said indicator, said contacts being effective in a closed position to connect their respective operating buses to a common point, circuit means connecting one terminal of said motor to said common point and selectively connecting the other terminal of said motor to a source of energy, control contact means selectively operative to apply an opposite source of energy to said operating buses in any selected one of the different code combinations corresponding to the code combinations assigned to the different positions of said indicator, said energization always being with respect to a predetermined number of buses less than said particular number of operating buses, whereby said indicator is operative to any one of its several different positions upon the operation of said contact means to selectively energize said operating buses in accordance with a particular selected code combination, and means connected to said buses and controlled responsive to the selective energization of said buses by said control contact means and said source of energy applied through closed contacts of said indicator for giving an indication only when said indicator has operated to a position corresponding to the position called for by the combination of buses then energized.

2. In a changeable indicator display system, a particular number of operating buses, a changeable indicator having an electric motor for operating it to a plurality of different positions and having contacts individually cooperative with said operating buses and respectively opened and closed by the operation of said indicator to its different positions in accordance with code combinations of bus energization respectively assigned to the different positions of said indicator, each of said contacts being effective in a closed position to connect its respective operating bus to a common point, said contacts having predetermined code combinations assigned to them for the different positions such as to always have a predetermined number of contacts closed for each of the different positions, circuit means connecting one terminal of said motor to said common point and selectively connecting the other terminal of said motor to a source of energy, control contact means selectively operative to apply an opposite source of energy to said operating buses in any selected one of said different code combinations corresponding to the code combinations assigned to the different positions of said indicator, a plurality of checking relays, one for each of said operating buses, circuit means for connecting one terminal of each of said checking relays to its respective operating bus and for connecting the opposite terminal of each checking relay to said opposite source of energy, whereby for any given position of said indicator those checking relays are energized which are connected to those buses having said indicator connected thereto with corresponding ones of its contacts closed, said checking relays being constructed to have sufficiently high resistance in their circuits as to limit the current through them below that value which will operate said motor.

3. In a changeable indicator display system, a particular number of operating buses, a changeable indicator having an electric motor for operating it to a plurality of different positions and having contacts individually cooperative with said operating buses and respectively opened and closed by the operation of said indicator to its different positions in accordance with code combinations respectively assigned to the different positions of said indicator, each of said contacts being effective in a closed position to connect its respective operating bus to a common point, circuit means connecting one terminal of said motor to said common point and selectively connecting the other terminal thereof to a source of energy, said contacts having predetermined code combinations assigned to the different positions such as to always have a predetermined number of said contacts closed for each of the different positions, said predetermined number being less than said particular number of operating buses, a plurality of checking relays each having two windings wound in opposition, one for each of said operating buses, circuit means for connecting the end terminations of said two windings of each of said checking relays to its respective operating bus and for connecting one opposite end termination of one winding of each said checking relay to an opposite source of energy and the other opposite end termination of the other winding of each said checking relay to said source of energy, and circuit means including said predetermined number of closed contacts respective of said windings having said opposite source of energy applied to one end termination thereof and said motor with said source of energy applied thereto for effectively energizing respective checking relays without causing rotation of said motor.

4. In a changeable indicator display system, a particular number of operating buses, a changeable indicator having an electric motor for operating it to a plurality of different positions and having contacts individually cooperative with said operating buses and respectively opened and closed by the operation of said indicator to its different positions in accordance with code combinations of bus energization respectively assigned to the different positions of said indicator, each of said contacts being effective in a closed position to connect its respective operating bus to a common point, said contacts having predetermined code combinations assigned to them for the different positions such as to always have a predetermined number of contacts closed for each of the different positions, circuit means connecting one terminal of said motor to said common point and selectively connecting the other terminal of said motor to a source of energy, control contact means selectively operative to apply an opposite source of energy to said operating buses in any selected one of said different code combinations corresponding to the code combinations assigned to the different positions of said indicator, a plurality of checking relays, one for each of said operating buses, and each of said checking relays having two separate windings, circuit means for connecting one terminal of each winding of each of said checking relays to the respective operating bus for that relay and for connecting the opposite terminal of one winding to said opposite source of energy and connecting the opposite terminal of the other winding to said source of energy, said connections being such that the flux produced by the two windings are equal and opposite to effectively cancel each other, said checking relays being constructed to have sufficiently high resistance in their circuits as to limit the current through them below that value which will operate said motor, whereby said checking relays are caused to be picked up for those buses having said opposite source of energy applied thereto by said control contact means and also for those buses connected through said closed contacts of said indicator in its then selected position to said source of energy through said motor.

5. In a changeable indicator display system, a particular number of operating buses, a plurality of changeable indicators each operative to a plurality of different positions, each indicator of said plurality of indicators having contacts individually cooperative with said operating buses and respectively opened and closed by the operation of each indicator of said plurality of indicators to its different positions in accordance with code combinations respectively assigned to the different positions of each indicator of said plurality of indicators, each of said contacts being effective in a closed position to connect its respective operating bus to a common point, said contacts having predetermined code combinations assigned to the different positions such as to always have a predetermined and same number of said contacts of each indicator of said plurality of indicators closed for each of the different positions, said predetermined and same number being less than said particular number of operating buses, an indicator selecting contact for each indicator of said plurality of indicators selectively operative to connect a source of energy to said common point therefor, a plurality of checking relays, one for each of said operating buses, circuit means for connecting one terminal of each of said checking relays to its respective operating bus and for connecting the opposite terminal of each checking relay to an opposite source of energy, whereby a similar number of said checking relays are selectively controlled to energize positions in combinations for each position of each indicator individually selected from said plurality of indicators.

6. In a changeable indicator display system, a particular number of operating buses, a plurality of changeable indicators each having an electric motor for operating it to a plurality of different positions and each having contacts individually cooperative with said operating buses and respectively opened and closed by the operation of each said indicator to its different positions in accordance with code combinations respectively assigned to the different positions of each said indicator, each of said contacts being effective in a closed position to connect its respective operating bus to a common point, said contacts for each of said plurality of changeable indicators being positioned for each code condition such as to always have a similar number of contacts closed therein, an indicator selecting contact for each indicator of said plurality of indicators, circuit means connecting one terminal of said motor to said common point and the other terminal of said motor to its respective indicator selecting contact selectively operative to connect to a source of energy, and contact means selectively operative to apply an opposite source of energy to said operating buses in different selected combinations corresponding to the code combinations assigned to any desired position of each said indicator, said energization always being with respect to a predetermined and same number of operating buses less than said particular number of operating buses but greater than said similar number of closed contacts.

7. In a changeable indicator display system, a particular number of operating buses, a plurality of changeable indicators each having an electric motor for operating it to a plurality of different positions and each having contacts individually cooperative with said operating buses and respectively opened and closed by the operation of each said indicator to its different positions in accordance with code combinations respectively assigned to the different positions of each said indicator, each of said contacts being effective in a closed position to connect its respective operating bus to a common point, said contacts having predetermined code combinations assigned to the different positions such as to always have a predetermined number of said contacts of each said indicator closed for each of the different positions, said predetermined number being less than said particular number of operating buses, an indicator selecting contact for each said indicator of said plurality of indicators selectively operative to connect a source of energy to said common point through said motor therefor, a plurality of checking relays each having two windings wound in opposition, one for each of said operating buses, circuit means for connecting the end terminations of said two windings of each of said checking relays to its respective operating bus and for connecting one opposite end termination of one winding of each said checking relay to an opposite source of energy and the other opposite end termination of the other winding of each said checking relay to said source of energy, and other circuit means including said windings having said opposite source of energy applied to respective one end terminations and having respective opposite end terminations connected to an operating bus, a selected said indicator having therefor said predetermined number of closed contacts, said motor and said indicator selecting contact connected to said source of energy for effectively energizing the associated checking relays but at the same time failing to cause rotation of said motor.

8. In a changeable indicator display system, a particular number of operating buses, a plurality of changeable indicators each having an electric motor for operating it to a plurality of different positions and each having contacts individually cooperative with said operating buses and respectively opened and closed by the operation of each said indicator to its different positions in accordance with code combinations respectively assigned to the different positions of each said indicator, a diode connected in each of said operating buses for each said indicator, each of said contacts being effective in a closed position to maintain electrical connection of its respective operating bus through a said diode to a common point, an indicator selecting contact for each indicator of said plurality of indicators, circuit means connecting one terminal of said motor to said common point and the other terminal of said motor to its respective indicator selecting contact selectively operative to connect to a source of energy, said diodes in combination preventing said source of energy from being applied directly to said operating buses through said motor and said contacts of an indicator of said plurality of indicators and through said contacts of one or more different indicators of said plurality of indicators, and contact means selectively operative to apply an opposite source of energy to said operating buses in different selected combinations corresponding to the code combinations assigned to any desired position of each said indicator, said energization always being with respect to a predetermined number of operating buses less than said particular number of operating buses.

9. In a changeable indicator display system, a plurality of operating buses, a plurality of changeable indicators each having an electric motor for operating it to a plurality of different positions when energized and each having contacts respectively opened and closed by the operation of said indicator to its different positions, said contacts being effective in a closed position to connect their respective operating buses to a common point, an indicator selecting contact for each of said plurality of indicators, circuit means for each indicator effective to connect the motor of that indicator to said common point and to said indicator selecting contact operative selectively to apply a source of energy to one terminal of said motor, a plurality of diodes associated with each indicator, one for each contact of that indicator and respectively connected in the circuit which that contact closes, and contact means operative to selectively apply an opposite source of energy to said operating buses to effect the operation of the particular indicator for which the said indicator selecting contact is then closed, said diodes provided with closed contacts of said plurality of changeable indicators being effective in combination to prevent erroneous energization of said operating buses therethrough.

10. In a changeable indicator display system, a plurality of operating buses, a plurality of changeable indicators each having an electric motor for operating it to a plurality of different positions when energized and each having contacts respectively opened and closed by the operation of said indicator to its different positions, said contacts being respectively connected to said buses and effective in a closed position to connect their respective operating buses to a common point, an indicator selecting contact of each of said plurality of indicators, circuit means for each indicator effective to connect one terminal of the motor of that indicator to said common point and to connect the other terminal of said indicator to said indicator selecting contact operative selectively to apply a source of energy to said other terminal of said motor, a plurality of diodes for each indicator, one for each contact of that indicator and respectively connected in the circuit which that contact closes, and contact means operative to selectively apply an opposite source of energy to said operating buses to effect the operation of that particular indicator for which the said indicator selecting contact is then closed, said diodes provided with closed contacts of said plurality of changeable indicators being effective in combination to prevent erroneous energization of said operating buses therethrough.

11. In a changeable indicator display system, a particular number of operating buses, a changeable indicator having an electric motor for operating it to a plurality of different positions and having contacts individually cooperative with said operating buses, said contacts being respectively opened and closed by the operation of said indicator to its different positions in accordance with code combinations respectively assigned to the different positions of said indicator, said contacts being effective in a closed position to connect their respective operating buses to a common point, circuit means connecting one terminal of said motor to said common point and the other terminal of said motor to one terminal of a source of energy, and a plurality of relay means each having a similar number of contacts operative to apply energy from the other terminal of the source of energy to said operating buses in different selected combinations corresponding to the code combinations assigned to any desired position of said indicator, said energization always being with respect to a predetermined number of buses less than said particular number of operating buses.

12. In a changeable indicator display system as specified in claim 11, wherein each of said contacts for each of said plurality of relay means is operative to complete an electrical circuit for energizing only its associated operating bus during the energized condition of its respective relay means and is operative to disconnect such electrical circuit during the deenergized condition of its respective relay means, thereby being effective only during the energized ocndition of its respective relay means.

13. In a changeable indicator display system, a changeable indicator having an electric motor for operating it to a plurality of different positions, a predetermined number of contacts in said indicator operative to opened and closed positions in different code combinations respectively assigned to the different positions of said indicator, means controlled by said motor for positioning said contacts in said different code combinations in sequence for the different positions of said indicator, said contacts being positioned in each of said code combinations where control of said indicator between succeeding positions requires less than said predetermined number of contacts with at least one of such contacts maintained closed for each position except the selected position in which all such contacts are opened, a plurality of operating buses one cooperative with each of said indicator contacts, circuit means connecting one side of all said contacts to a common point, a circuit means connecting one terminal of said motor to said common point and the other terminal thereof to a source of energy, and contact means operative for selectively controlling the application of an opposite source of energy to said operating buses in the different code combinations corresponding to the code combinations assigned to the different positions of said indicator and corresponding to said less number of contacts required for controlling said indicator to each such position.

14. A changeable indicator display system according to claim 13, wherein said plurality of operating buses is comprised of an odd number and the number of contacts in each of the different positions of said indicator which are in opened positions is an odd and identical number less than said number of operating buses.

15. A changeable indicator display system according to claim 14, wherein the number of contacts in each of the different positions of said indicator which are in a closed position is an even and identical number less than said number of operating buses, the selective energization of said plurality of operating buses in code combinations being such as to always include at least one of the closed contacts for controlling said indicator from an existing position to a desired position through intermediate positions.

16. In a changeable indicator display system, a plurality of changeable indicators each having an electric motor for operating it to a plurality of different positions and each having a predetermined number of contacts operative to opened and closed positions in different code combinations respectively assigned to the different positions for each respective said indicator, said contacts for each said indicator being operative positioned in each of said code combinations where control for that indicator between succeeding positions requires less than said predetermined number of contacts with at least one of such contacts maintained closed for each position except the selected position in which all such contacts are opened, an indicator selecting contact for each indicator of said plurality of indicators, a plurality of operating buses individually connected electrically to corresponding ones of said contacts for respective of said plurality of indicators, circuit means for each of said plurality of changeable indicators for connecting one terminal of the respective said motor to said common point and the other terminal of that said motor to its respective indicator selecting contact selectively operative to connect to an energy source, and contact means for selectively controlling the application of the opposite energy source to said operating buses in the different code combinations corresponding to the code combinations assigned to the different positions of each said indicator and corresponding to said less number of contacts required for controlling a selected said indicator to each such position.

17. A changeable indicator display system according to claim 16, wherein each of said plurality of indicators includes means controlled by the respective said motor for positioning the contacts of that indicator in said different code combinations in sequence for the different positions of that said indicator.

18. In a changeable indicator display system, a particular number of operating buses, a plurality of changeable indicators each having a motor for operating it to a plurality of different positions and each having contacts individually cooperative with said operating buses and respectively opened and closed by the operation of each said indicator to its different positions in accordance with code combinations respectively assigned to the different positions of each said indicator, an indicator selecting contact for each indicator of said plurality of indicators, circuit means for each of said plurality of indicators for connecting one terminal of said motor to a common connection of said contacts and the other terminal of said motor to its respective indicator selecting contact selectively operative to connect to a source of energy; selecting means for selectively energizing said operating buses in a code combination for each of the different positions of each of said plurality of indicators for controlling the respective motor of a selected said indicator through the corresponding closed contacts and indication check means connected to said operating buses rendered responsive to the selective energization of said operating buses for operating a selected said indicator to a desired position and further rendered responsive to circuits completed through said contacts which are closed in such desired position and according to the closed condition of said indicator selecting contact for that said indicator of said plurality of indicators, said indication check means being effective to provide an indication indicative of the response of that selected indicator.

19. A changeable indicator display system according to claim 18, wherein a plurality of diodes are included with each of said plurality of indicators, one connected in the circuit closed by each of said contacts thereof, whereby erroneous control of said means by said source of energy applied through closed contacts of at least two of said plurality of indicators is prevented according to said diodes being employed in combination.

20. In a changeable indicator display system, a changeable indicator operative to a plurality of positions, said indicator having a number of contacts less than said plurality of positions but operative to opened and closed positions in a number of code combinations corresponding to said plurality of positions with said combinations for said plurality of positions always having a given number of open contacts and a given number of closed contacts, control buses for said indicator including one bus for each of said contacts and cooperative therewith, circuit means for energizing said control buses in any selected combination corresponding to the combination assigned to any desired one of said plurality of positions of said indicator, driving means for said indicator, circuit means for causing said driving means to be controlled by the energy applied to said buses in a selected combination to operate said indicator to a position corresponding to that combination in which the contacts corresponding to the energized buses are then opened, circuit means for energizing the remaining buses through their respective contacts of said indicator then closed, and means responsive to such energization of said remaining buses to indicate that said indicator is in a position corresponding to the selected position.

21. In a changeable indicator display system, a particular number of operating buses, a plurality of changeable indicators each having driving means for operating it to a plurality of different positions greater in number than said particular number of buses and each having a plurality of contacts corresponding in number to said particular number of operating buses, said contacts of each indicator being respectively opened and closed in different code combinations by the operation of that indicator to its different positions to give distinctive code combinations respectively assigned to the different positions of such indicator, a plurality of diodes for each of said indicators, one for each contact of that said indicator, circuit means for each indicator for connecting from a common point through said contacts of that indicator in multiple to the respective buses with each of said diodes for the corresponding contacts being connected in series therewith, circuit means connecting one terminal of said driving means to said common point, other circuit means for selectively connecting the other terminal of said driving means of any particular changeable indicator to one terminal of a source of energy, and contact means at times operable to apply energy from the other terminal of said source to said operating buses in different selected code combinations corresponding to that code combination assigned to any desired position of a particular one of said indicators, said energization of said buses always being with respect to a predetermined number of said operating buses less than said particular number.

22. In a changeable indicator display system, a changeable indicator having driving means and a plurality of contacts, a plurality of buses, one for each of said contacts, connected to their respective contacts of said indicator, control means for energizing certain of said buses for controlling operation of said indicator, means connected through the contacts of said indicator corresponding to said energized buses to cause operation of said driving means, means effective to energize the remaining buses through their respective contacts of said indicator only when said indicator is in a particular position corresponding to that called for by said control means, and indication check means rendered active only when all said buses are energized.

References Cited in the file of this patent
UNITED STATES PATENTS

| | | |
|---|---|---|
| 1,367,583 | Bobroff | Feb. 8, 1921 |
| 2,046,977 | Sortore | July 7, 1936 |
| 2,074,066 | Wheeler | Mar. 16, 1937 |
| 2,387,850 | Loughridge | Oct. 30, 1945 |
| 2,623,111 | Chervenka | Dec. 23, 1952 |
| 2,676,289 | Wulfsberg | Apr. 20, 1954 |
| 2,736,017 | Marlowe | Feb. 21, 1956 |
| 2,754,500 | Lazich | July 10, 1956 |
| 2,755,458 | Rooks | July 17, 1956 |
| 2,827,626 | De Motte | Mar. 18, 1958 |